United States Patent [19]

Lee et al.

[11] Patent Number: 5,857,139
[45] Date of Patent: Jan. 5, 1999

[54] PROCESS FOR PREPARING AN ELECTRODE FOR SECONDARY BATTERY EMPLOYING HYDROGEN-STORAGE ALLOY

[75] Inventors: Jai-Young Lee, Taejon; Ki-Young Lee; Han-Ho Lee, both of Seoul; Dong-Myung Kim, Kyonggi-Do; Ji-Sang Yu, Seoul; Jae-Han Jung; Soo-Geun Lee, both of Taejon, all of Rep. of Korea

[73] Assignee: Korea Advanced Institute of Science and Technology, Taejon, Rep. of Korea

[21] Appl. No.: 637,887

[22] Filed: Apr. 25, 1996

[30] Foreign Application Priority Data

Apr. 25, 1995 [KR] Rep. of Korea .................... 1995-9806

[51] Int. Cl.$^6$ ........................................................ B22F 3/12
[52] U.S. Cl. ................................... 419/2; 419/25; 419/38
[58] Field of Search .................................... 419/2, 25, 38

[56] References Cited

U.S. PATENT DOCUMENTS

| | | | |
|---|---|---|---|
| 3,645,793 | 2/1972 | Hein et al. ................................ | 136/24 |
| 3,796,565 | 3/1974 | Hancock et al. ........................ | 75/211 |
| 3,802,878 | 4/1974 | Lingstrom ............................. | 75/208 R |
| 3,948,684 | 4/1976 | Armstrong ........................ | 136/120 FC |
| 3,972,726 | 8/1976 | Schmitt ..................................... | 136/20 |
| 4,430,294 | 2/1984 | Tracey ......................................... | 419/2 |
| 4,849,312 | 7/1989 | Mitsuyasu et al. ..................... | 429/217 |
| 5,194,343 | 3/1993 | Bloom et al. ........................... | 429/218 |
| 5,387,478 | 2/1995 | Muta et al. ............................... | 429/59 |
| 5,393,616 | 2/1995 | Mori et al. ............................... | 429/59 |
| 5,407,761 | 4/1995 | Ovshinsky et al. ...................... | 429/59 |
| 5,554,456 | 9/1996 | Ovshinsky et al ........................ | 429/59 |

*Primary Examiner*—Charles T. Jordan
*Assistant Examiner*—Daniel Jenkins
*Attorney, Agent, or Firm*—Darby & Darby

[57] ABSTRACT

The present invention relates to a process for preparing an electrode for secondary battery employing hydrogen-storage alloy systems, more specifically, to a process for preparing an anode material for secondary battery which can be charged/discharged in an electrolyte and has a high discharge efficiency and energy density per unit weight, by sintering a mixture of hydrogen-storage alloy systems. An electrode for secondary battery of the present invention is prepared by the process which comprises the steps of: (i) mixing a hydrogen-storage alloy powder free of Ni with a hydrogen-storage alloy powder containing Ni over 30 atomic %; (ii) cold-pressing the mixed powder at a pressure of 5 to 15 ton/cm$^2$; (iii) sintering the cold-pressed mixture in a quartz tube at 900° C. for 5 to 15 min under a vacuum condition of $10^{-2}$ to $10^{-3}$ torr; and, (iv) quenching the sintered material.

5 Claims, 16 Drawing Sheets

5,857,139

PROCESS FOR PREPARING AN ELECTRODE FOR SECONDARY BATTERY EMPLOYING HYDROGEN-STORAGE ALLOY

FIELD OF THE INVENTION

The present invention relates to a process for preparing an electrode for secondary battery employing hydrogen-storage alloy systems, more specifically, to a process for preparing an anode material for secondary battery which can be charged/discharged in an electrolyte and has a high discharge efficiency and energy density per unit weight, by sintering a mixture of hydrogen-storage alloy systems.

BACKGROUND OF THE INVENTION

In general, hydrogen-storage alloy system, to be used as an electrode material for secondary battery, must have a hydrogenation characteristic such as a proper plateau pressure, high hydrogen-storage capacity and hydriding rate, and long cycle-life.

Hydrogen-storage alloy systems containing transition metal elements such as V—Ti and Ti—Mn, though they can store large amounts of hydrogen, have never been used as the electrode material for secondary battery, due to their poor hydrogen absorption/desorption behaviour in the electrolyte. The said problem is basically grounded on a phenomenon that: when hydrogen is electrochemically charged on a hydrogen-storage alloy, hydrogenation of the alloy become impossible, while the alloy system can absorb/desorb large amounts of hydrogen in a gas phase, since absorption of hydrogen is protected by the oxidized or hydroxylated surface films produced by the interaction with oxygen in the air or with hydroxide ion($OH^-$) in the electrolyte.

On the other hand, Fetcenko et al. describes that Ni plays a catalytic role in absorption/desorption of hydrogen for hydrogen-storage alloy in electrolyte(see: M. A. Fetcenko et al., Presentation at Electrochemical Society, 10.15(1991)).

Ezaki et al, teaches that Ti and V have the highest hydrogen evolution overpotential and Ni has the lowest one, based on the results of the hydrogen evolution overpotential determination for metals such as Ti, V, Ct, Mn, Fe, Co, Ni and Cu in 1N $H_2SO_4$ solution(see: H; Ezaki et al., Electrochimica Acta, 38(4):557–564(1993)).

Accordingly, the hydrogen-storage alloy, to absorb hydrogen in electrolyte, must comprise an element which exists as a stable metal atom in the electrolyte and provides a catalytic effect on the electrolysis of hydrogen.

In this connection, $MnNi_5$ and V—Ti—Zr—Ni alloy systems containing Ni which is stable in electrolyte, have been used as MH anode material for secondary battery. The electrode for secondary battery, which is prepared by the substitution of elements constituting the hydrogen-storage alloys such as Vi—Ti and Ti—Nn by Ni, has not been practically applied in the art, since the hydrogen-storage behaviour of the alloy system is not consistent in a way that plateau pressure may be increased or reversible storage capacity may be decreased.

Under the circumstances, needs have been continued to exist for the development of at electrode for secondary battery which has a charging/discharging behaviour in electrolyte and has a high discharge efficiency and energy density per unit weight.

SUMMARY OF THE INVENTION

In accordance with the present invention, it has been discovered that: an electrode for secondary battery which has a charging/discharging behavior in an electrolyte and has a high discharge efficiency and energy density per unit weight, can be prepared by sintering a mixture of An alloy free of Ni which can store large amounts of hydrogen under a gas phase while it can not absorb/desorb the hydrogen in the electrolyte, and an alloy containing Ni which can absorb/desorb the hydrogen in the electrolyte.

A primary object of the invention is, therefore, to provide a process for preparing an electrode for secondary battery which can be charged/discharged in an electrolyte and has a high discharge efficiency and energy density per unit weight.

BRIEF DESCRIPTION OF DRAWINGS

The above and the other objects and features of the present invention will become apparent from the following descriptions given in conjunction with the accompanying drawings, in which.

DETAILED DESCRIPTION OF THE INVENTION

An electrode for secondary battery of the present invention is prepared by the process which comprises the steps of:
(i) mixing hydrogen-storage alloy powder free of Ni with a hydrogen-storage alloy powder containing Ni over 30 atomic %;
(ii) cold-pressing the mixed powder at a pressure of 5 to 15 $ton/cm^2$;
(iii) sintering the cold-pressed mixture in a quartz tube at 900° C. for 5 to 15 min under a vacuum condition of $10^{-2}$ to $10^{-3}$ torr; and,
(iv) quenching the sintered material.

In the process for preparing an electrode for secondary battery of the invention, hydrogen-storage alloy systems such as V—Ti and Ti—Mn which can store large amounts of hydrogen under a gas phase, while they can not absorb/desorb the hydrogen in an electrolyte, is preferably employed as the hydrogen-storage alloy powder which does not contain Ni; and, hydrogen-storage alloy systems such as $LaNi_5$, Zr—Cr—Ni, Zr—Vi—Ni and Ti—Ni which can absorb/desorb hydrogen and can be discharged in the electrolyte, is employed as the hydrogen-storage powder containing Ni. On the other hand, the hydrogen-storage powder containing Ni is preferably added to the hydrogen-storage powder which does not contain Ni at a ratio of 25 to 100 wt %.

A preferred embodiment of the present invention is described in more detail accompanying with the drawings.

Figure 1:
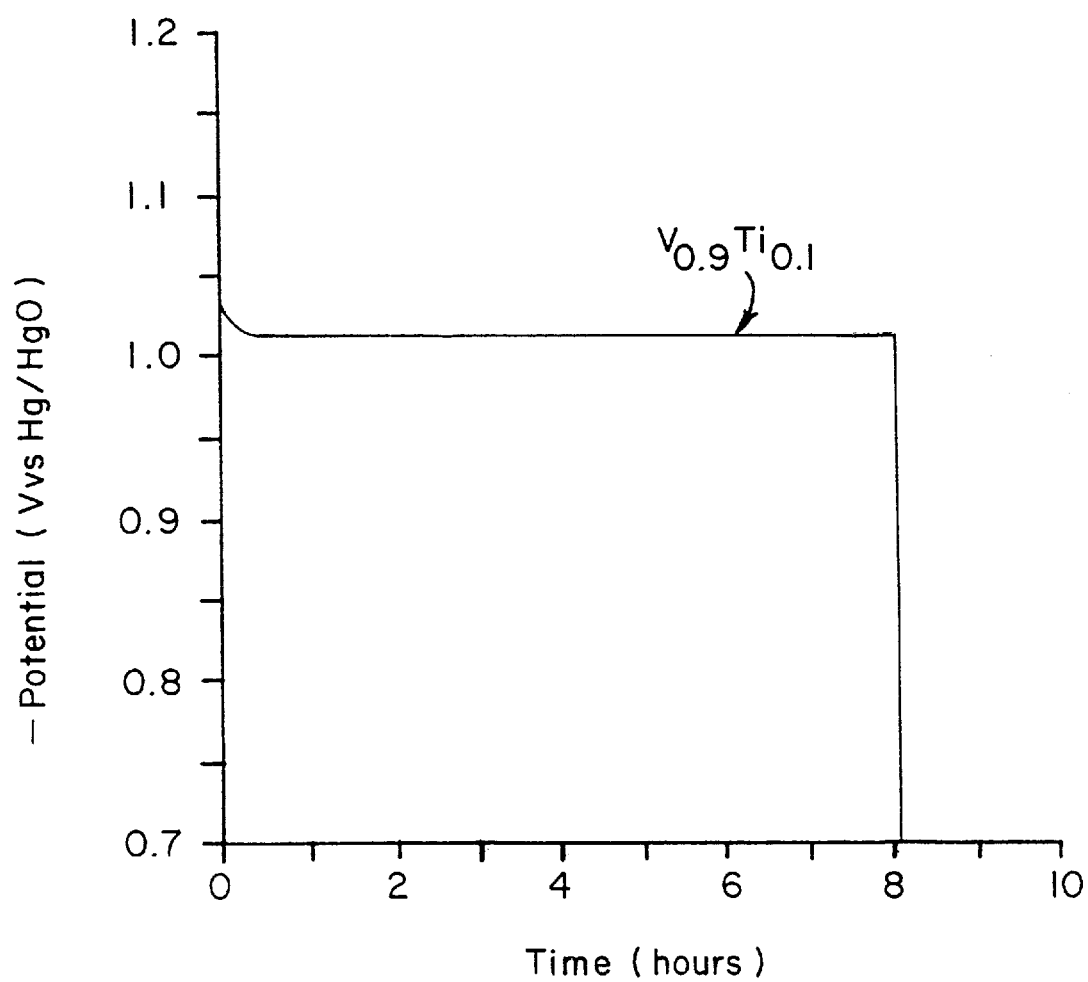
FIG. 1 is a graph showing a charging/discharging behaviour of a prior art V—Ti alloy system in an electrolyte.

FIG. 1 is a graph showing a charging/discharging behaviour of a prior art V—Ti alloy system(i.e., $V_{0.9}Ti_{0.1}$) in an electrolyte, where time-course of the electric potential versus Hg/HgO electrode is showed, in a case that both of charging current and discharging current are 25 mAh/g, respectively. As can be seen in FIG. 1, V—Ti hydrogen-storage alloy system can store large amounts of hydrogen in a gas phase, while the alloy can not electrochemically be hydrogenated in the electrolyte. Accordingly, it is clearly determined that the surface of a hydrogen-storage alloy must provide a catalytic effect on the absorption/desorption of hydrogen in the electrolyte to solve the said problems.

Figure 2:
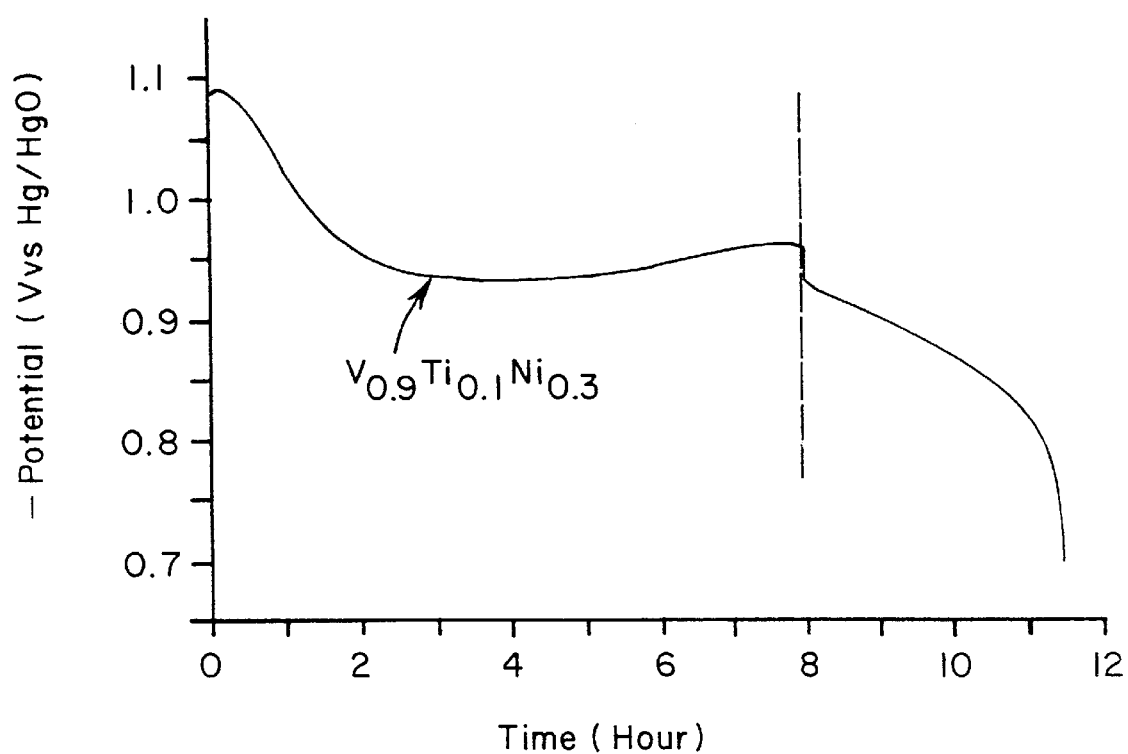
FIG. 2 is a graph showing a charging/discharging behaviour of a prior art $V_{0.9}Ti_{0.1}Ni_{0.3}$ alloy system in an electrolyte.

FIG. 2 is a graph showing a charging/discharging behaviour of a prior art $V_{0.9}Ti_{0.1}Ni_{0.3}$ alloy system which is prepared by the substitution of Ni for $V_{0.9}Ti_{0.1}$ in an electrolyte. The charging period is shown to the left of the horizontal dotted line, and the discharging period is shown to the right of the horizontal dotted line. As can be seen in FIG. 2, it was determined that Ni powder plays a catalytic role in the absorption/desorption of hydrogen in an electrolyte, since the prior art alloy can absorb hydrogen in the course of charging and can be discharged in the electrolyte.

Figure 3:
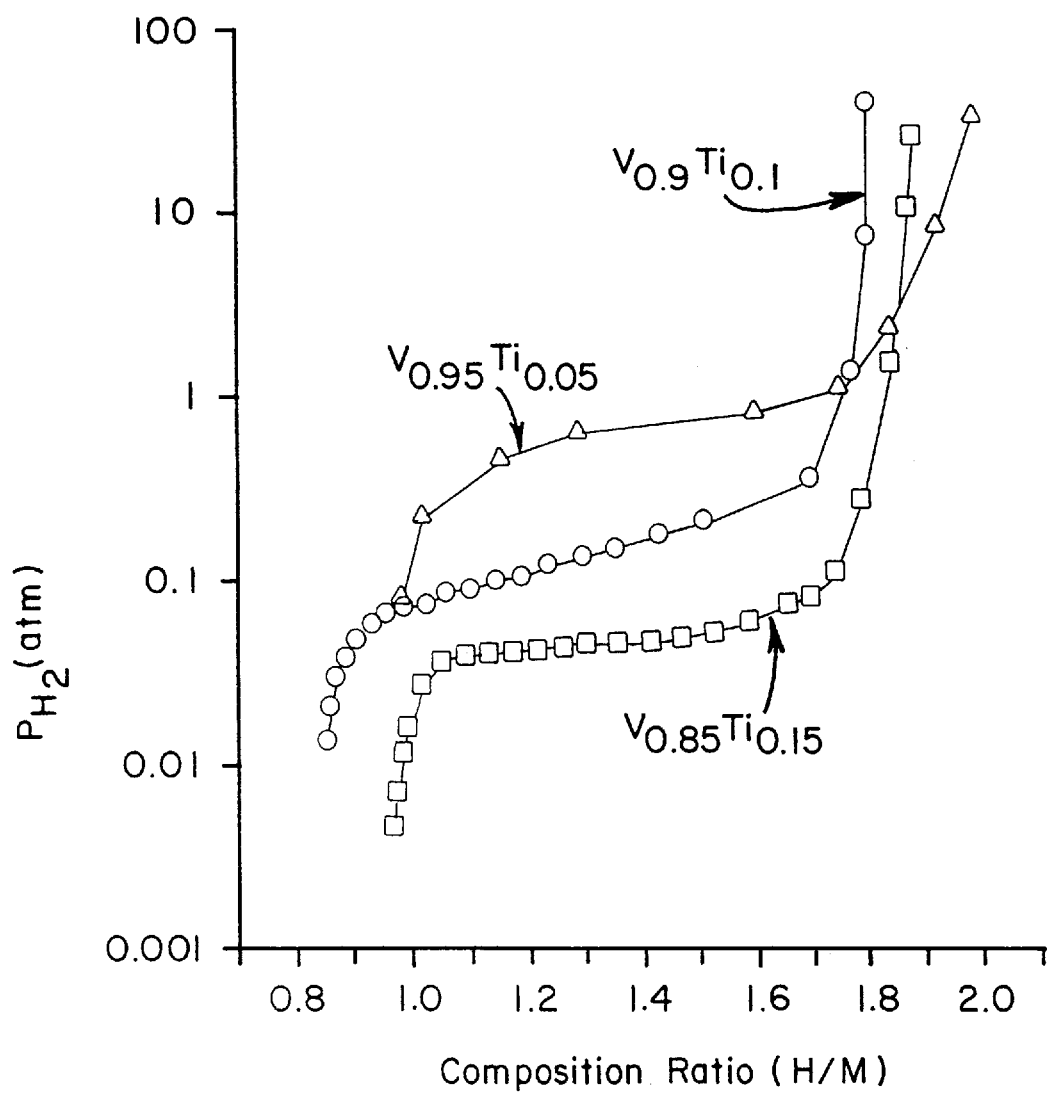
FIG. 3 is a graph showing P-C-T curve of a prior art V—Ti alloy system.

FIG. 3 is a graph showing P-C-T(pressure-composition-temperature) curve of a prior art V—Ti alloy system, where the desorption is carried out at 30° C. In FIG. 3, $(--\Delta--)$, $(--\bullet--)$ and $(--\blacksquare--)$ represent P-C-T curves for $V_{0.95}Ti_{0.05}$, $V_{0.9}T_{0.1}$ and $V_{0.85}Ti_{0.15}$ alloy systems, respectively. As can be seen in FIG. 3, hydrogen can be absorbed and desorbed in the upper plateau pressure region of V—Ti alloy reversibly, where theoretical capacity is about 500 mAh/g (about 2 wt %) which proposes a potential for high-capacity electrode, while it can not charge/discharge in electrolyte by itself.

Figure 4:
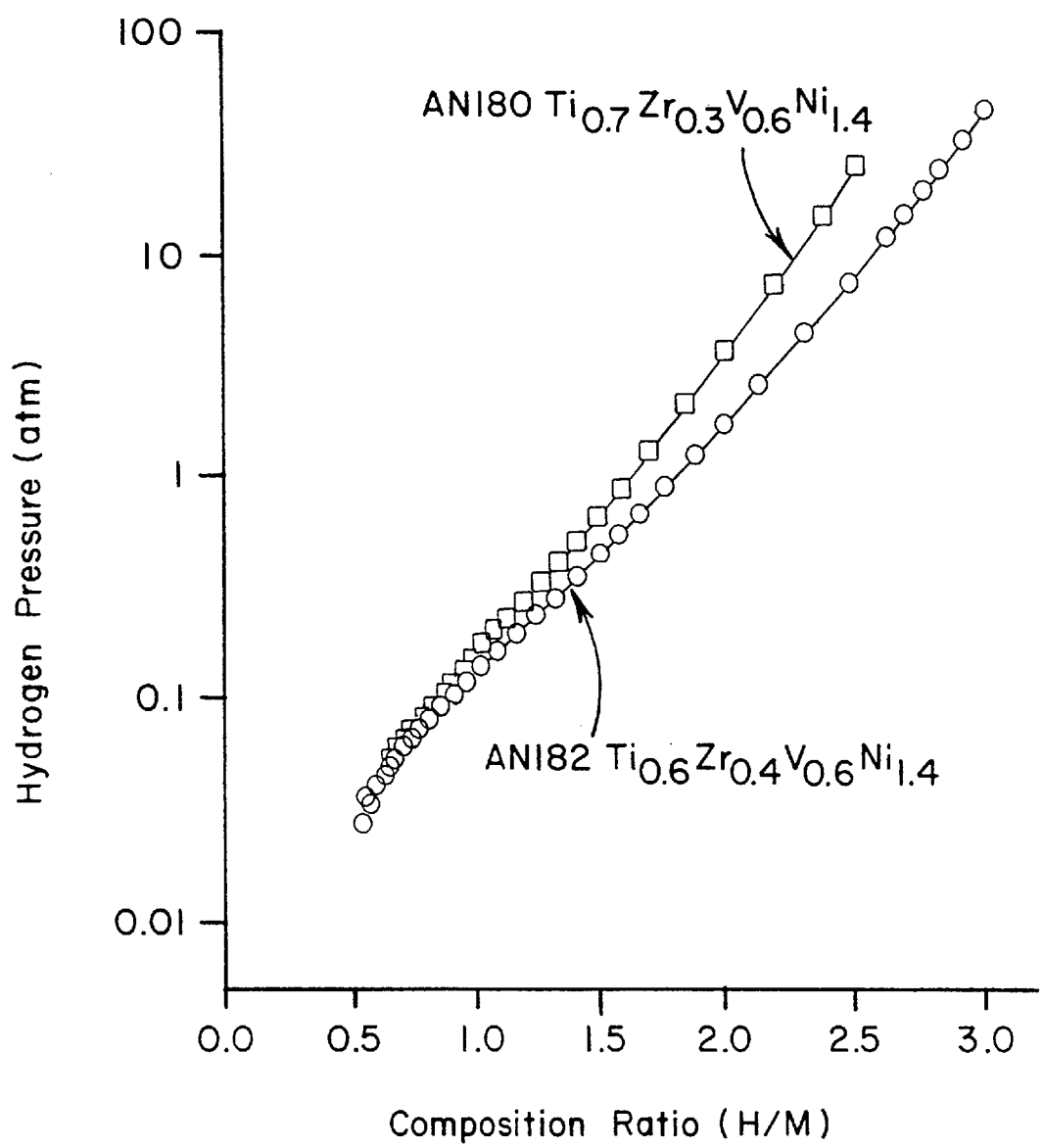
FIG. 4 is a graph showing P-C-T curve of a prior art Ti—Zi—V—Ni alloy system.

FIG. 4 is a graph showing P-C-T curve of a prior art Ti—Zr—V—Ni alloy system, where desorption is carried out at 30° C. In FIG. 4, $(--\circ--)$ and $(--\blacksquare--)$ represent P-C-T curves for $Ti_{0.6}Zi_{0.4}V_{0.6}N_{1.4}$ and $Ti_{0.7}Zi_{0.3}V_{0.6}N_{1.4}$ alloy systems, respectively. The said Ti—Zi—V—Ni alloy system is determined as a hydrogen-storage alloy having C14 structure and whose theoretical capacity is about 200 mAh/g(0.8 wt %).

Figure 5:
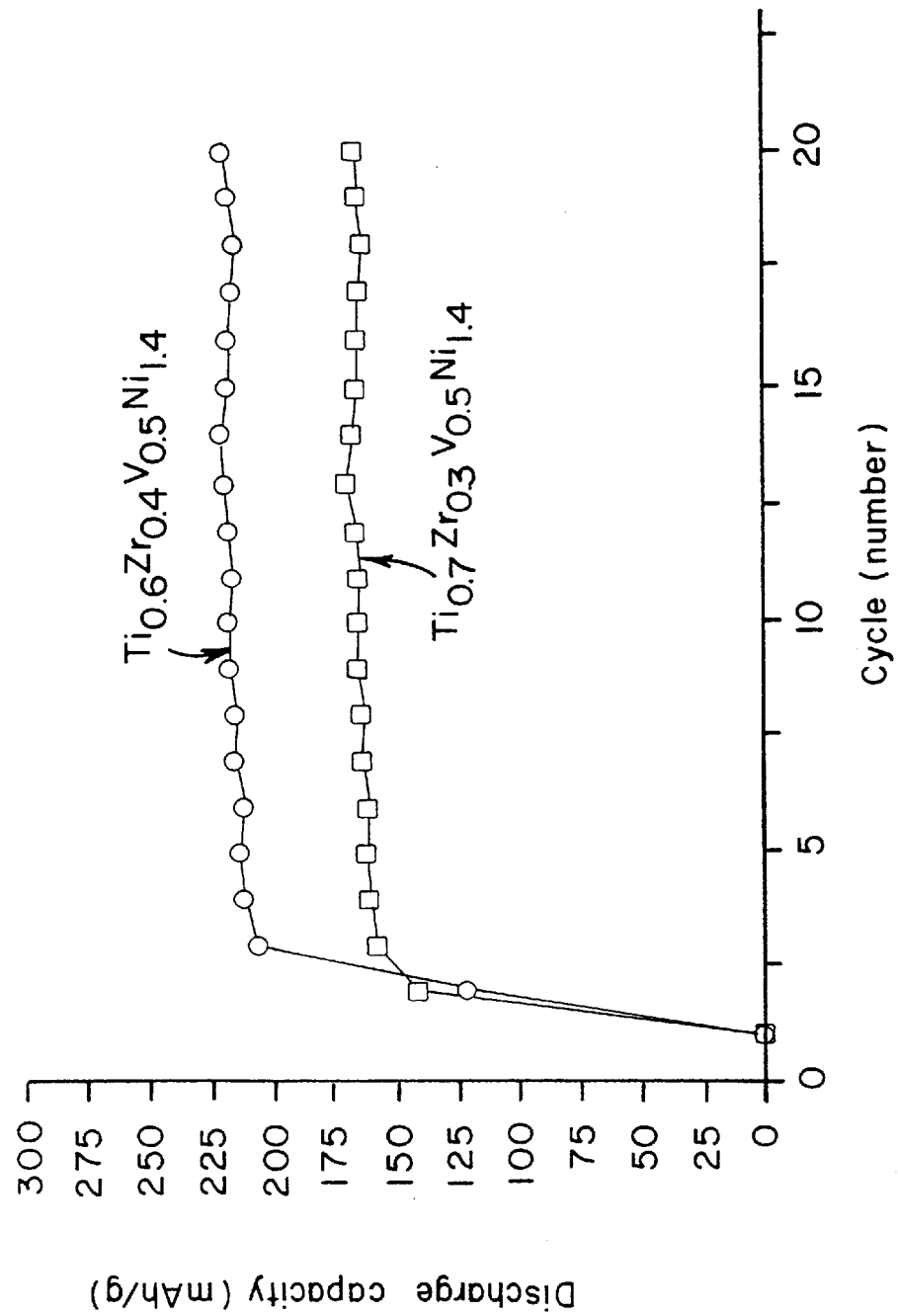
FIG. 5 is a graph showing the changes in discharge capacity of a prior art Ti—Zr—V—Ni alloy system in accordance with charging/discharging cycle.

FIG. 5 is a graph showing the changes in discharge capacity of a prior art Ti—Zr—V—Ni alloy system in accordance with charging/discharging cycle, which is determined at a condition of current density 50 mAh/g and 30° C. In FIG. 5, $(--\bullet--)$ and $(--\blacksquare--)$ represent the changes in discharge capacity for $Ti_{0.6}Zi_{0.4}V_{0.6}Ni_{1.4}$ and $Ti_{0.7}Zr_{0.3}V_{0.6}Ni_{1.4}$ alloy systems. As can be seen in FIG. 5, Ti—Zr—V—Ni alloy system has a capacity of 160 to 220 mAh/g.

From the results shown in FIGS. 1 to 5, V—Ti or Ti—Zr—V—Ni alloy system is mixed with Ni powder, and sintered to produce an alloy which can be discharged in an electrolyte in the prior art, where the amount of Ni powder is a critical factor determining energy density per unit weight of secondary battery in the course of MH electrode construction. The amount of the second phase or Ni which gives a catalytic power to the surface of hydrogen-storage alloy is increased, to heighten the discharge efficiency, as the amount of Ni powder is increased; and, therefore, there has been continued a need to develop a method for increasing the energy density per unit weight, while conferring a catalytic power on the surface of the alloy. Accordingly, it has been known that a catalytic effect conferred on the surface of the hydrogen-storage alloy, permits an efficient discharging in the electrolyte while increasing energy density per unit weight, if a hydrogen-storage alloy is prepared by sintering with Ni-rich compounds such as $LaNi_5$, Ti—Ni and Zr—V—Ni alloy which can absorb large amounts of hydrogen, instead of Ni.

Figure 6:
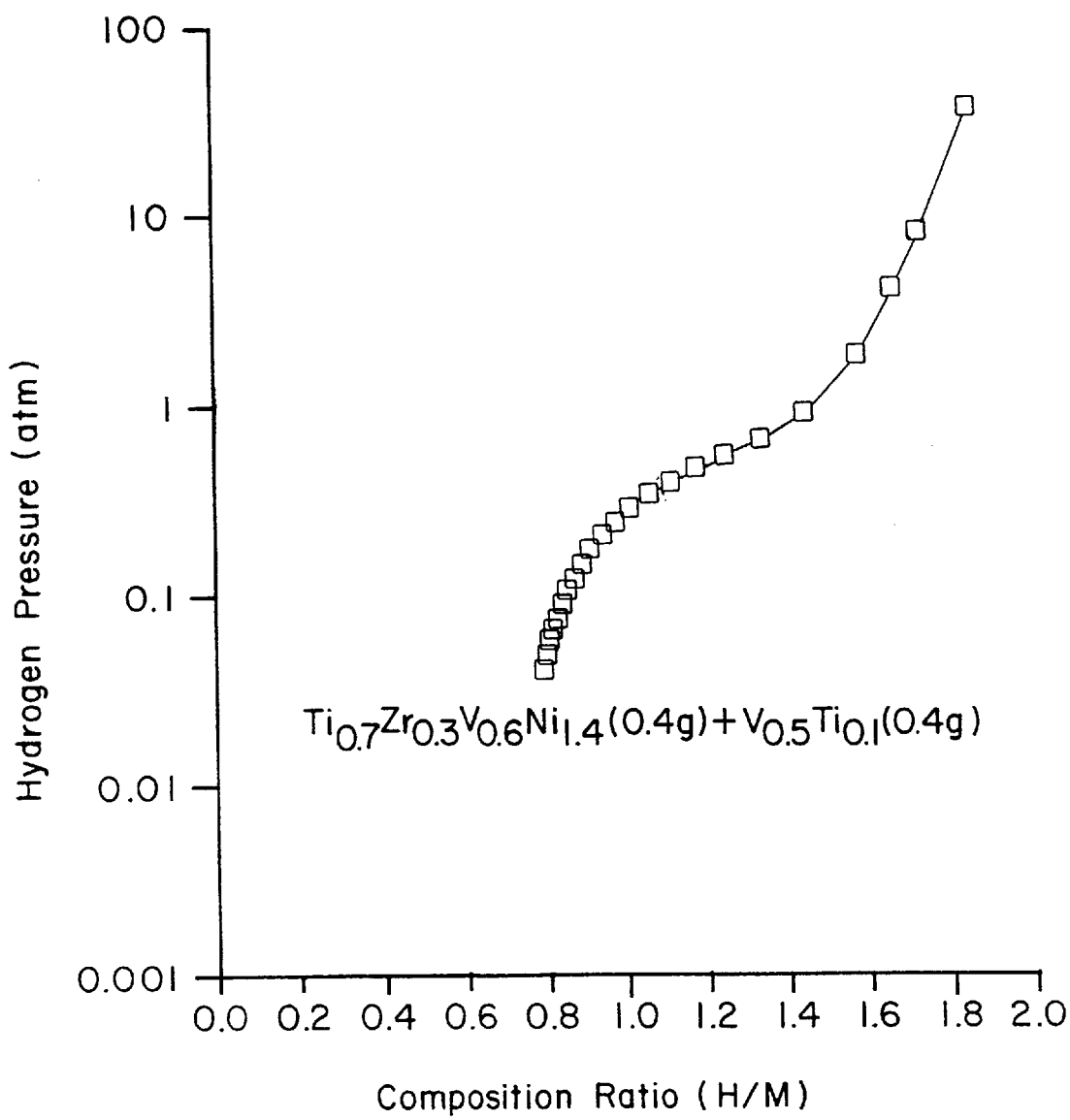
FIG. 6 is a graph showing P-C-T curve of an electrode specimen for secondary battery of the invention, which is prepared by sintering a mixture of $Ti_{0.7}Zr_{0.3}V_{0.6}Ni_{1.4}$ and $V_{0.9}Ti_{0.1}$ alloy system.

FIG. 6 is a graph showing P-C-T curve of an electrode specimen for secondary battery which is prepared by cold-pressing and sintering a mixture of and $Ti_{0.7}Zr_{0.3}V_{0.6}Ni_{1.4}$ and $V_{0.9}Ti_{0.1}$ alloy system(1:1, w/w), where cold-pressing pressure is 10 $ton/cm^2$ and sintering is carried out at 900° C. for 10 min. As can be seen in FIG. 6, it is determined that the theoretical discharge capacity for an electrode specimen of the invention is about 340 mAh/g.

Figure 7:
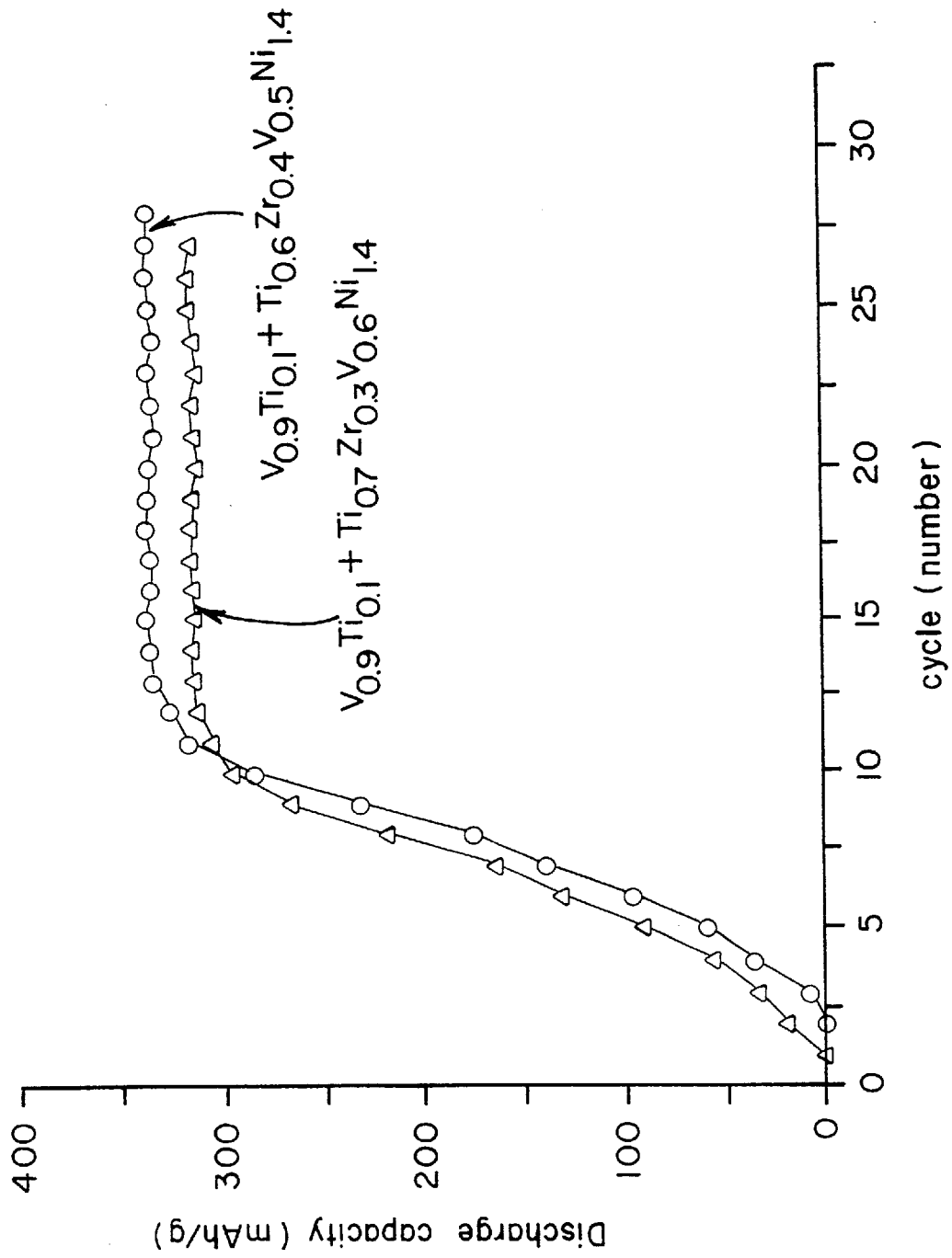
FIG. 7 is a graph showing the changes in discharge capacity of an electrode specimen for secondary battery which is prepared by sintering a mixture of Ti—Zr—V—Ni and V—Ti alloy system, in accordance with charging/discharging cycle.

FIG. 7 is a graph showing the changes in discharge capacity of an electrode specimen for secondary battery which is prepared by cold-pressing and sintering a mixture of Ti—Zr—V—Ni and V—Ni and V—Ti alloy system(1:1, w/w), which is determined at a condition of current density 50 mAh/g and 30° C. In FIG. 7, $(--\bullet--)$ and $(--\Delta--)$ represent the curves of discharge capacity for $TiO_{0.6}Zi_{0.4}V_{0.6}Ni_{1.4}$ and $V_{0.9}Ti_{0.1}$ alloy systems and $Ti_{0.7}Zr_{0.3}V_{0.6}Ni_{1.4}$ and $V_{0.9}Ti_{0.1}$ alloy systems respectively. As can be seen in FIG. 7, it is clearly determined that the electrode for secondary battery has high energy density per unit weight and has a discharge capacity of 280 to 320 mAh/g, which is much higher than that of 160 to 220 mAh/g of Ti—Zi—V—Ni alloy system, and it can be charged/discharged in electrolyte.

Figure 8:
FIG. 8 is a scanning electron microscopy photograph showing an electrode specimen for secondary battery which is prepared by sintering a mixture of $Ti_{0.7}Zr_{0.3}V_{0.6}Ni_{1.4}$ and $V_{0.9}Ti_{0.1}$ alloy system before activation.

FIG. 8 is a scanning electron microscopy photograph showing an electrode specimen for secondary battery which is prepared by sintering a mixture of $Ti_{0.7}Zr_{0.3}V_{0.6}Ni_{1.4}$ and $V_{0.9}Ti_{0.1}$ alloy system(1:1, w/w) at 900° C. for 10 min before activation, where contrast difference according to the composition of electrode is appeared by employing back scattering image. In FIG. 8, bright and dark represent Ti—Zr—V—Ni and V—Ti alloy system regions, respectively. As can be seen in FIG. 8, new phase has not been formed between the said two alloy systems.

Figure 9:
FIG. 9 is a scanning electron microscopy photograph showing the electrode specimen for secondary battery of FIG. 8 after activation.

FIG. 9 is a scanning electron microscopy photograph showing an electrode specimen for secondary battery which is prepared by sintering a mixture of $Ti_{0.7}Zr_{0.3}V_{0.6}Ni_{1.4}$ alloy with $V_{0.9}Ti_{0.1}$ alloy system after activation, where bright and dark region represent Ti—Zr—V—Ni alloy containing a lot of Ni and V—Ti alloy, respectively. As can be seen in FIG. 9, it is determined that cracks are spreaded from the bright to dark regions. Accordingly, it was clearly confirmed that V—Ti alloy is changed to absorb hydrogen by the catalytic behaviour of Ti—Zr—V—Ni alloy system.

Figure 10:
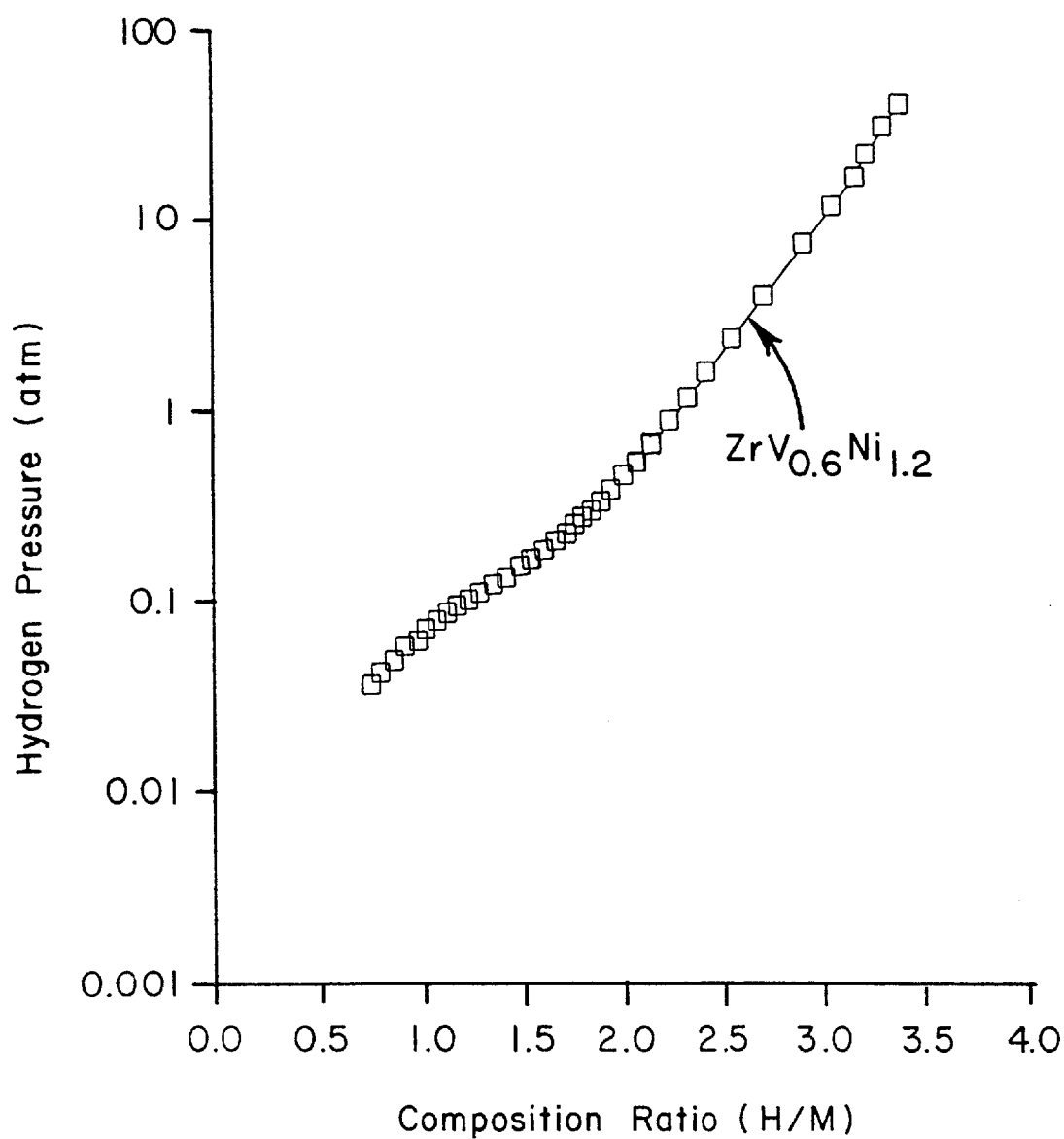
FIG. 10 is a graph showing P-C-T curve of a prior art $ZrV_{0.6}Ni_{1.2}$ alloy system.

FIG. 10 is a graph showing P-C-T curve of a prior art $ZrV_{0.6}Ni_{1.2}$ alloy system, where the desorption is carried out at 60° C. In FIG. 10, theoretical capacity is determined to be about 350 mAh/g(1.3 wt %).

Figure 11:
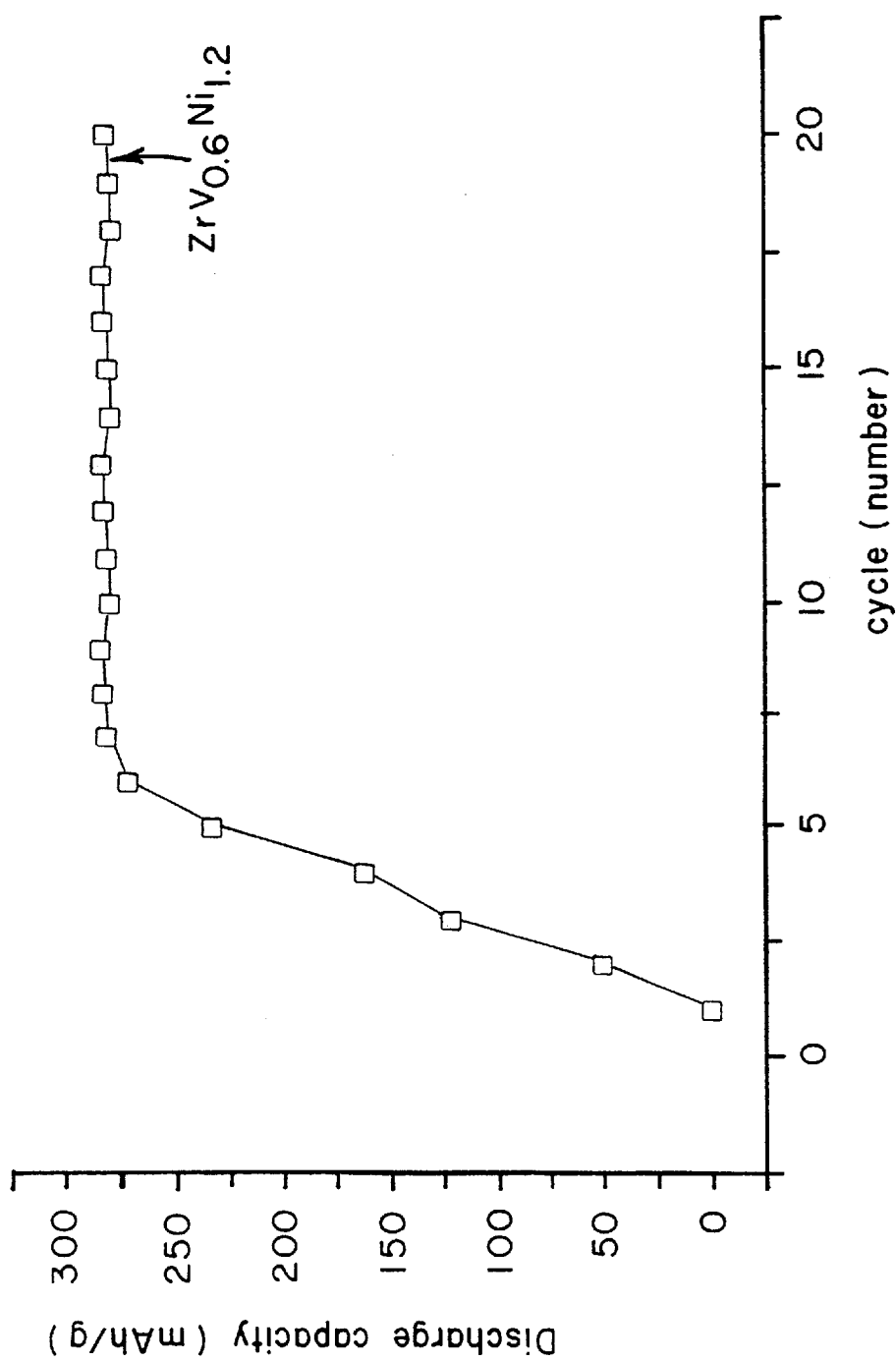
FIG. 11 is a graph showing the changes in discharge capacity of a prior art $ZrV_{0.6}Ni_{1.2}$ alloy system in accordance with charging/discharging cycle.

FIG. 11 is a graph showing the changes in discharge capacity of a prior art $ZrV_{0.6}Ni_{1.2}$ alloy system in accordance with charging/discharging cycle, where theoretical capacity is determined to be about 280 mAh/g.

Figure 12:
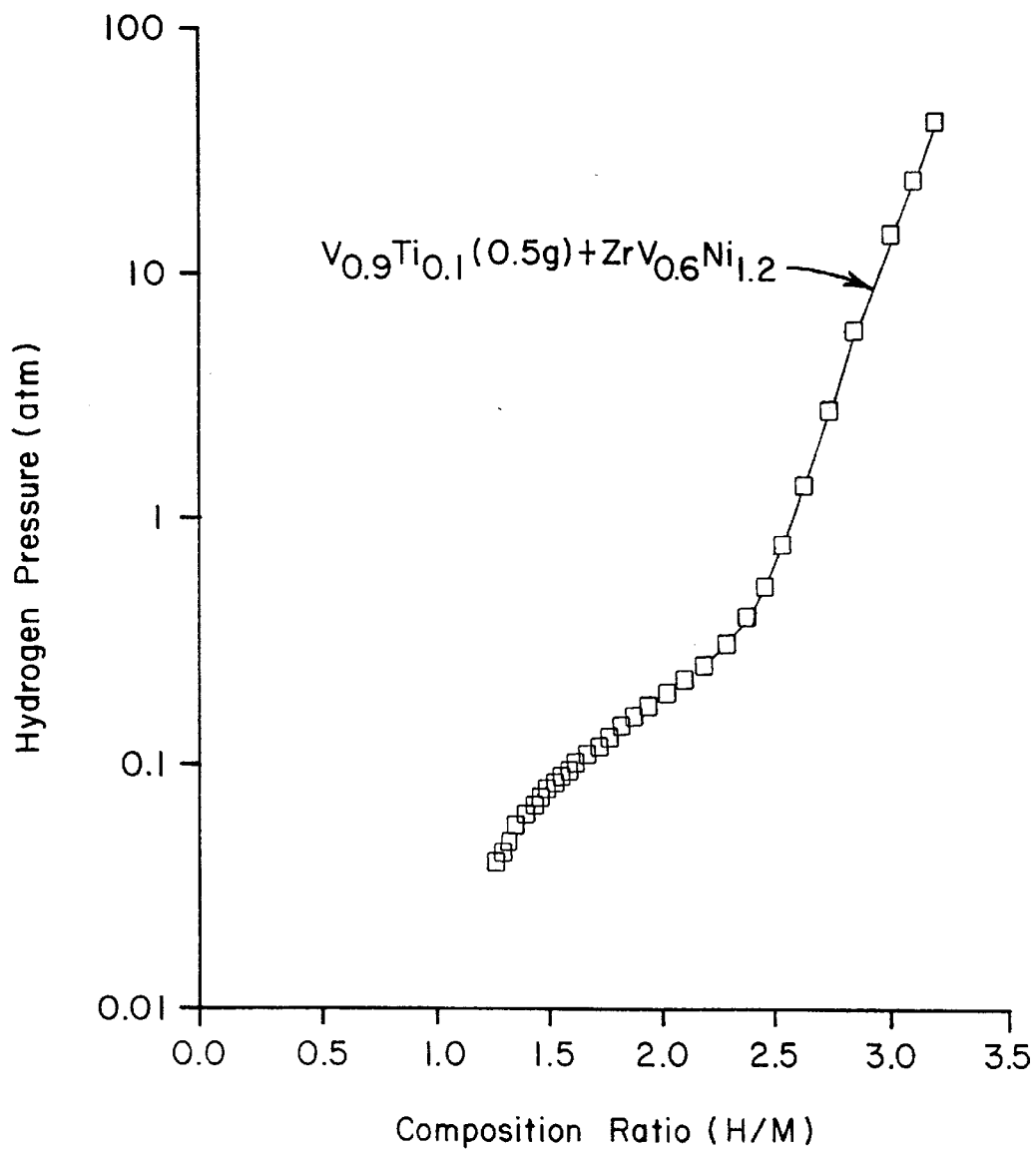
FIG. 12 is a graph showing P-C-T curve of an electrolyte specimen for secondary battery of the invention, which is prepared by sintering a mixture of $V_{0.9}Ti_{0.1}$ and $ZrV_{0.6}Ni_{1.2}$ alloy system.

FIG. 12 is a graph showing P-C-T curve of an electrode specimen for secondary battery which is, prepared by cold-pressing and sintering a mixture of $V_{0.9}Ti_{0.1}$ and $ZrV_{0.6}Ni_{1.2}$ (1:1, w/w), where cold-pressing pressure is 10 ton/cm$^2$ and sintering is carried out at 900° C. for 15 min. As can be seen in FIG. 12, theoretical capacity is determined to be about 400 mAh/g.

Figure 13:
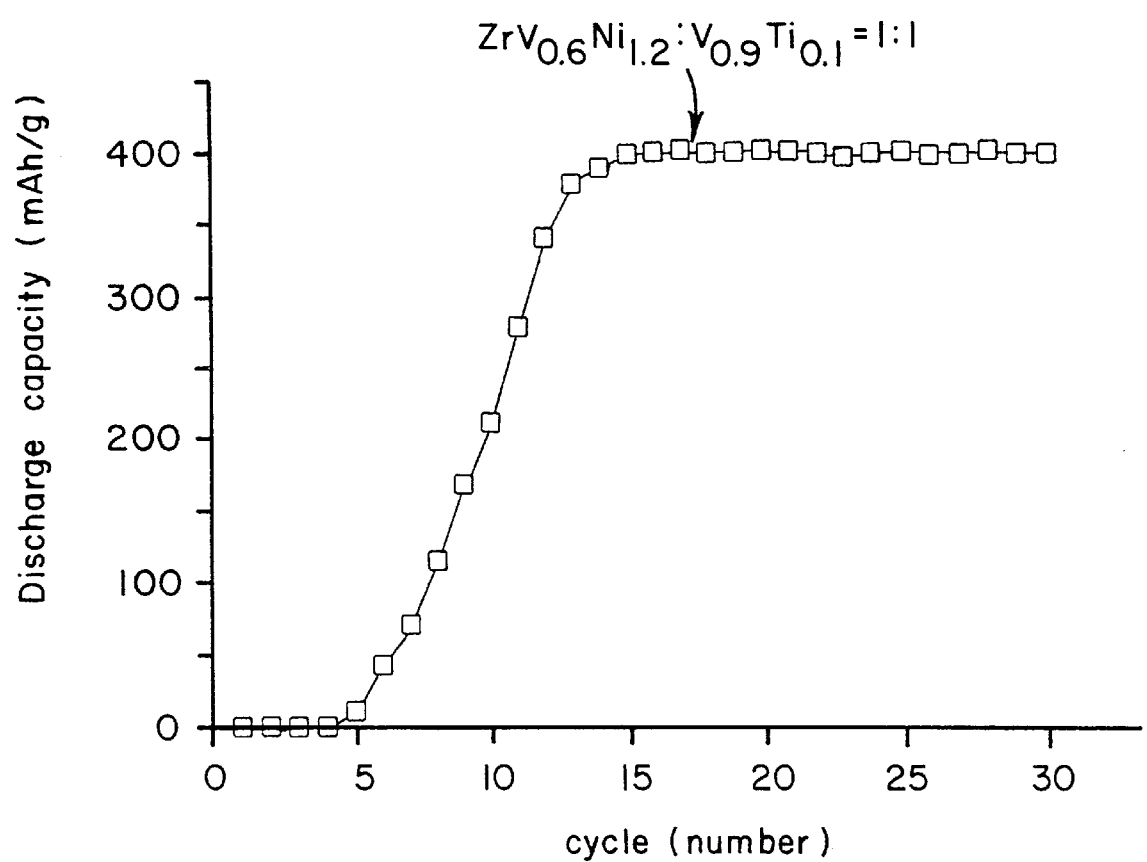
FIG. 13 is a graph showing the changes in discharge capacity of an electrode specimen for secondary battery which is prepared by sintering a mixture of $ZrV_{0.6}Ni_{1.2}$ and $V_{0.9}Ti_{0.1}$ alloy system.

FIG. 13 is a graph showing the changes in discharge capacity of an electrode specimen for secondary battery which is prepared by cold-pressing and sintering a mixture of $ZrV_{0.6}Ni_{1.2}$ and $V_{0.9}Ti_{0.1}$(1:1, w/w) at 900° C. for 10 min. As can be seen in FIG. 13, it is clearly determined that the discharge capacity is about 400 mAh/g, which is much higher than that of about 280 mAh/g of $ZrV_{0.6}Ni_{1.2}$, and the electrode can be charged/discharged in electrolyte, based on the change of characteristics of V—Ti alloy by the aid of Zr—Vi—Ni alloy system(i.e., from the one which has a high theoretical discharge capacity though it can not be discharged by itself, to the one which can be absorbed/desorbed).

Figure 14:
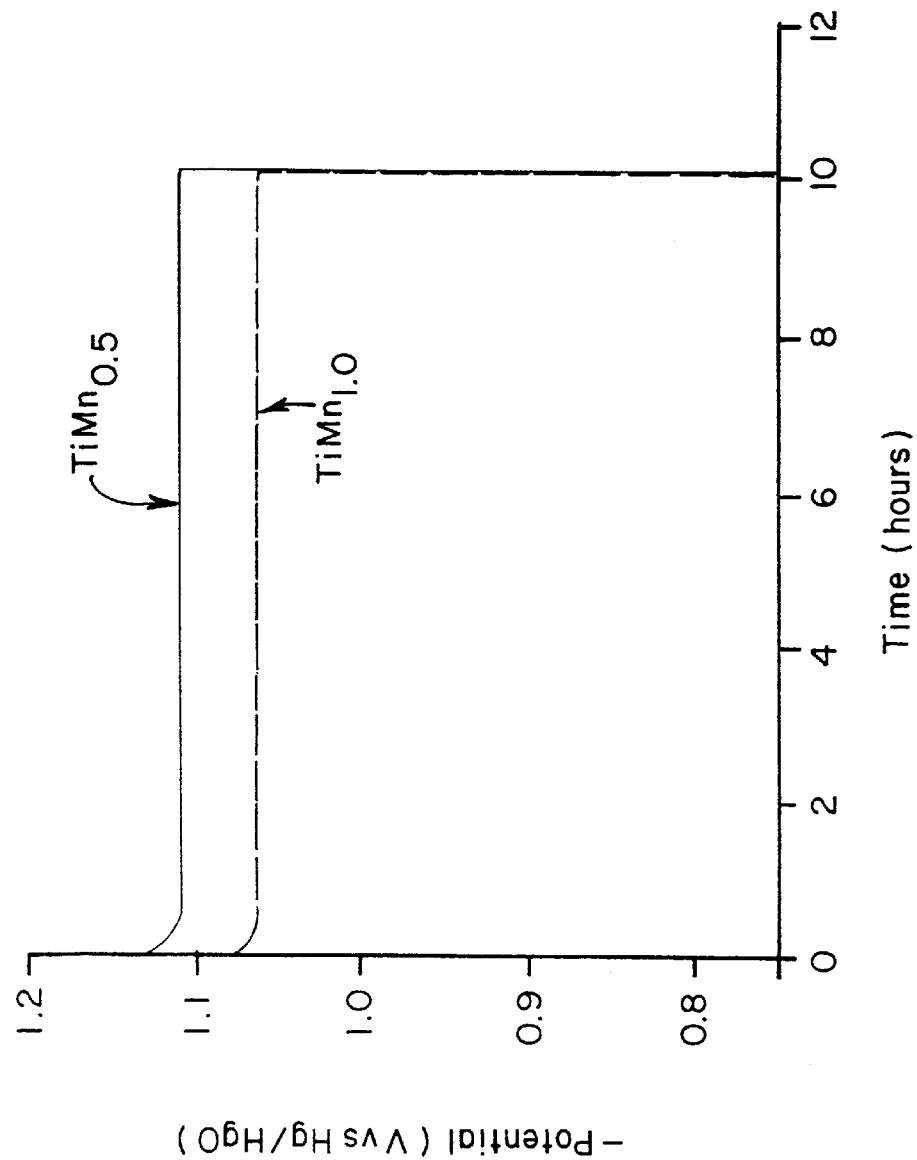
FIG. 14 is a graph showing a charging/discharging behaviour of a prior art Ti—Mn alloy system in an electrolyte.

FIG. 14 is a graph showing a charging/discharging behaviour of a prior art Ti—Mn alloy system which does not contain Ni, where time-course of the electric potential versus Hg/HgO electrode is shown, in a case that both of charging and discharging currents are 25 mAh/g. As can be seen in FIG. 14, hydrogen-storage material employing TiMn Alloy system can store large amounts of hydrogen in gas phase, while electrochemical hydrogenation of alloy is not possible.

Figure 15:
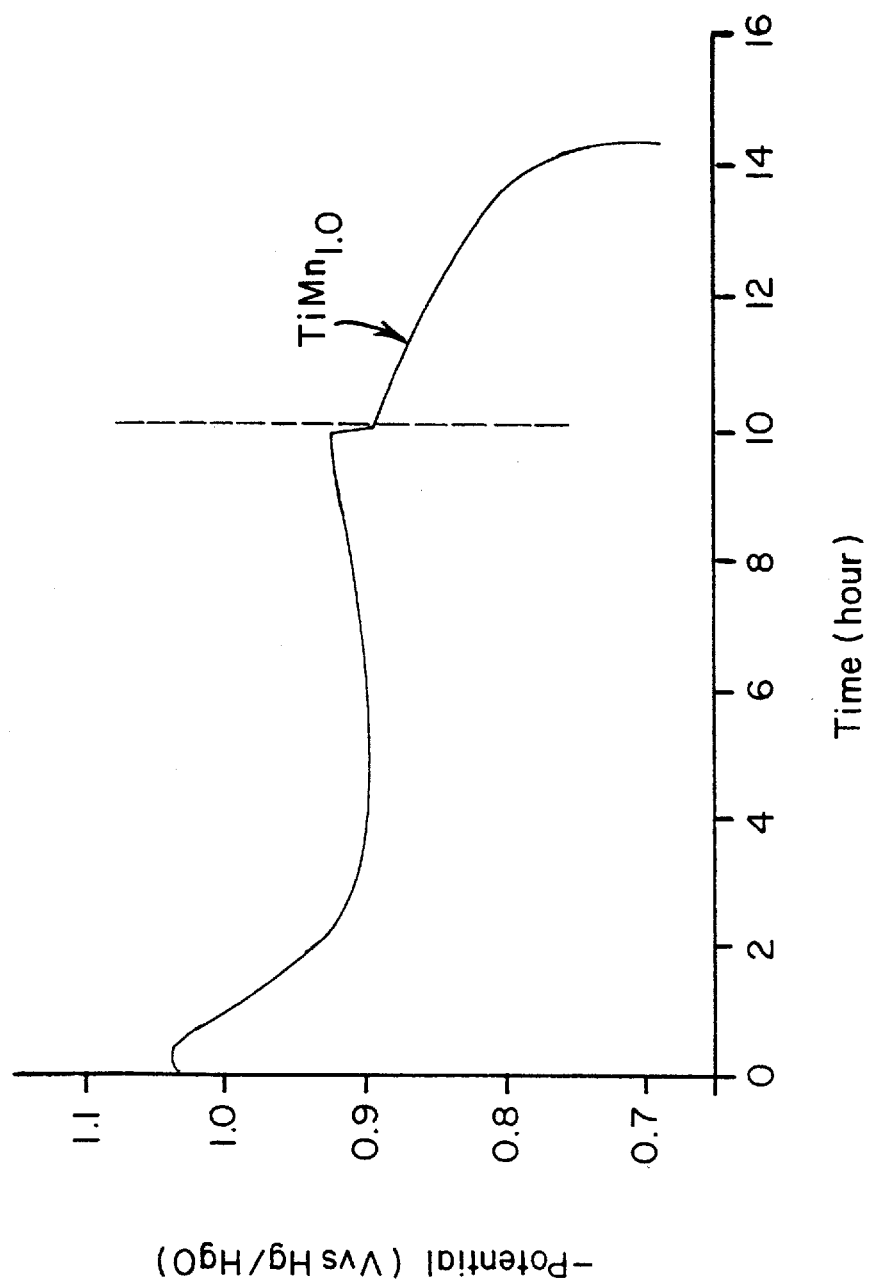
FIG. 15 is a graph showing the changes in discharge capacity of prior art electrode specimen for secondary battery which is prepared by sintering a mixture of $TiMn_{1.0}$ alloy and Ni powder.

FIG. 15 is a graph showing the changes in discharge capacity of a prior art electrode for secondary battery which is prepared by sintering a mixture of $TiMn_{1.0}$ alloy and Ni powder(1:1, w/w) at 900° C. for 10 min. The charging is shown to the left of the horizontal dotted line, and the discharging period is shown to the right of the horizontal dotted line. The prior art alloy can absorb hydrogen in the course of charging and can discharge thereof, which is caused by a catalytic role of Ni for hydrogen absorption/desorption in the electrolyte.

Figure 16:
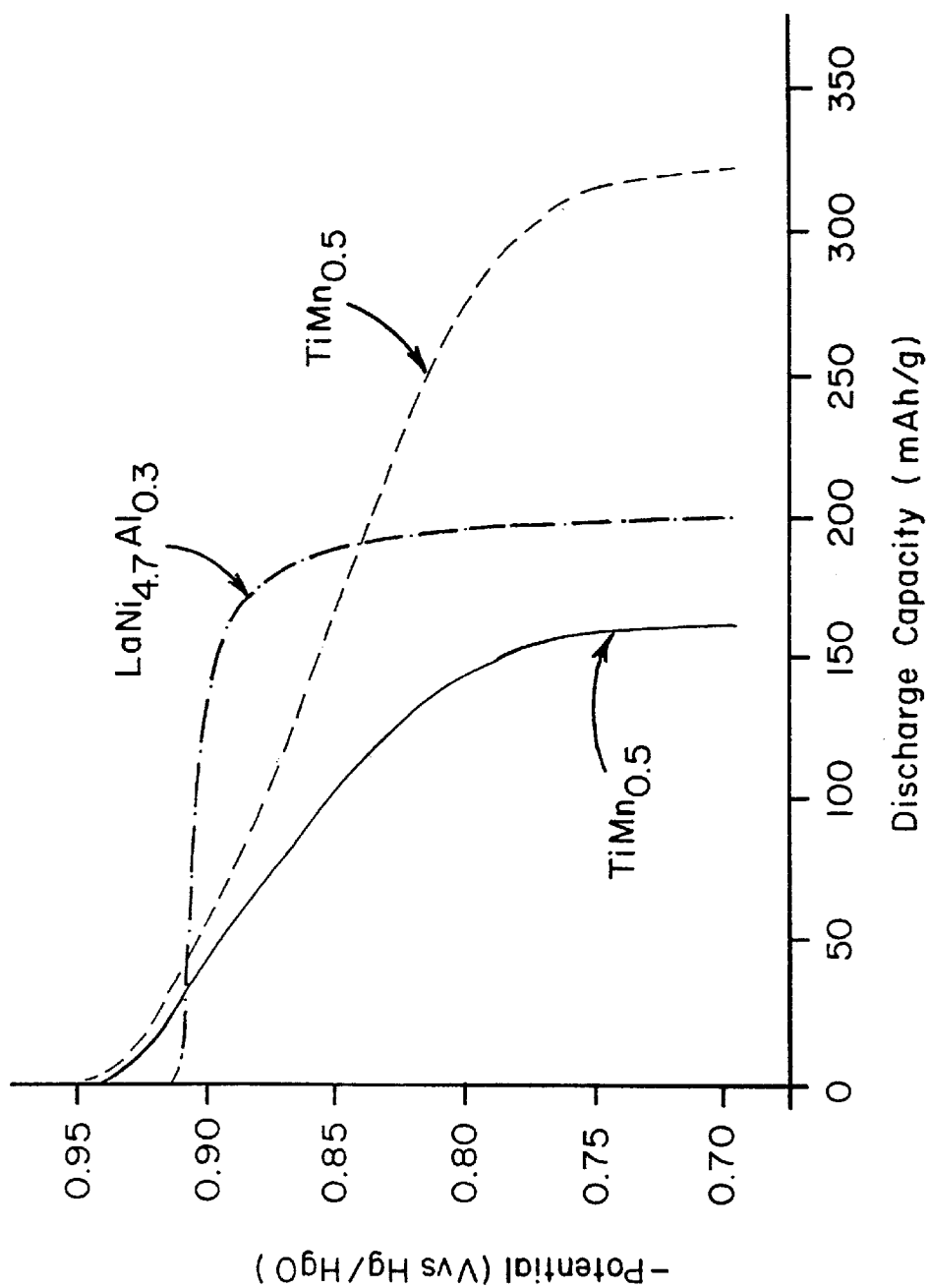
FIG. 16 is a graph showing a charging/discharging behaviour of an electrode specimen for secondary battery of the invention, which is prepared by sintering a mixture of $TiMn_{0.5}$ and $LaNi_{4.7}Al_{0.3}$ alloy system.

FIG. 16 is a graph showing a charging/discharging behaviour of an electrode specimen for secondary battery which is prepared by sintering a mixture of $TiMn_{0.5}$ and $LaNi_{4.7}Al_{0.3}$ (1:1, w/w) at 900° C. for 10 min. In FIG. 16, (---), (-··-) and (———) represent charging/discharging curves for an electrode specimen of the invention, a prior art electrode specimen prepared by sintering a mixture of $TiMn_{0.5}$ alloy and Ni(1:1, w/w) at 900° C. for 10 min, and $LaNi_{4.7}Al_{0.3}$ respectively. As can be seen in FIG. 16, the electrode prepared by the invention can provide much higher discharge capacity than the prior art electrode which is sintered with Ni powder, based on the increase in energy density of electrode per unit weight which is grounded that substitution of $LaNi_{4.7}Al_{0.3}$ which is a dischargeable hydrogen-storage alloy for Ni which can not contribute to discharge capacity gives catalytic power to the surface of Ti—Mn alloy system.

Figure 17:
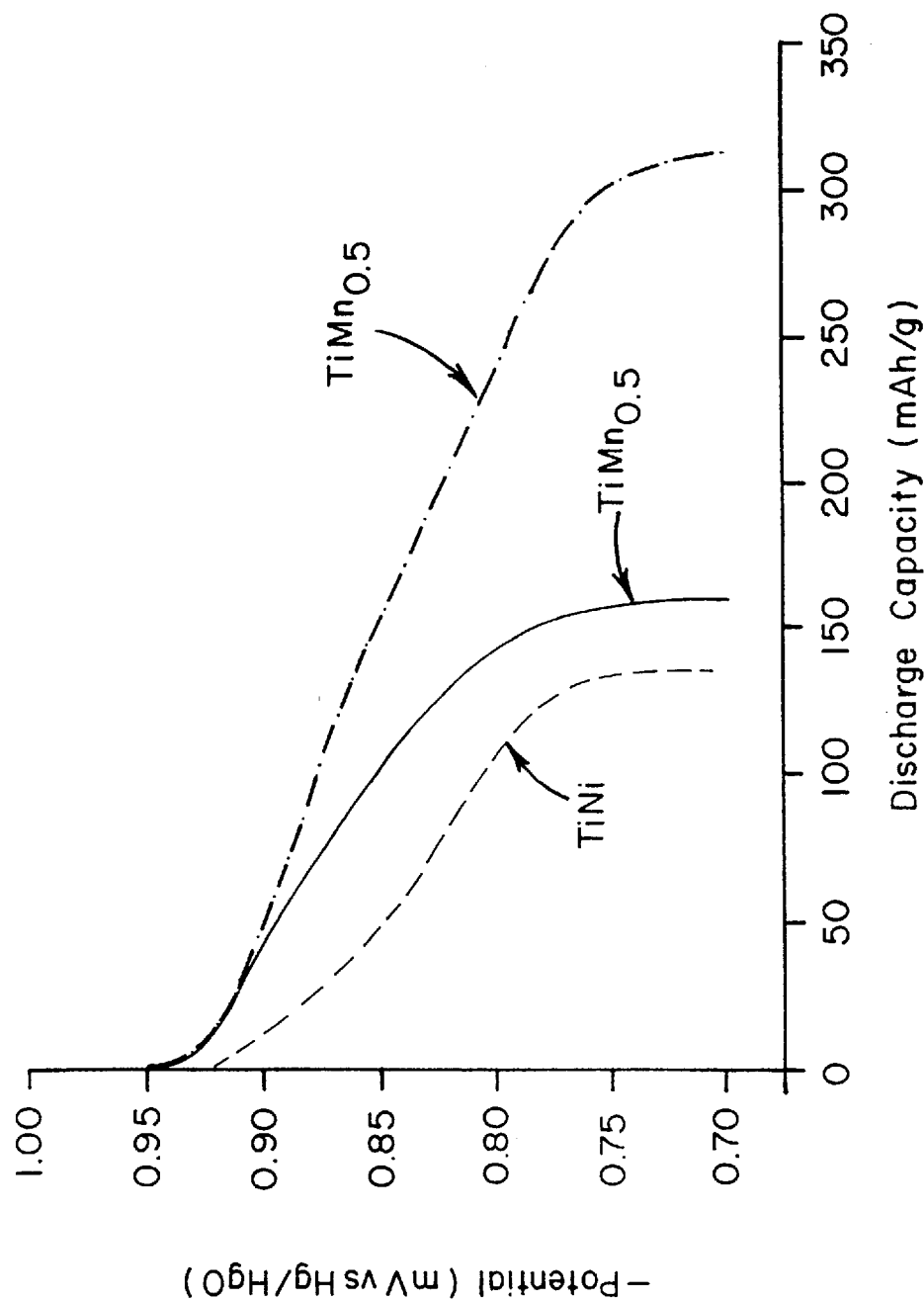
FIG. 17 is a graph showing a charging/discharging behaviour of an electrode specimen for secondary battery of the invention, which is prepared by sintering a mixture of $TiMn_{0.5}$ and TiNi alloy system.

FIG. 17 is a graph showing a charging/discharging behaviour of an electrode for secondary battery which is prepared by sintering a mixture of $TiMn_{0.5}$ with TiNi(1:1, w/w) at 900° C. for 10 min. In FIG. 17, (---), (———) and (-··-) represent charging/discharging curves for the electrode of the invention, a prior art electrode prepared by sintering a mixture of $TiMn_{0.5}$ and Ni(1:1, w/w) at 900° C. for 10 min and TiNi alloy, respectively. As can be seen in FIG. 17, it is clearly determined that the electrode prepared by the present invention provides much higher discharge capacity than the prior art electrode sintered with Ni powder.

As clearly illustrated and demonstrated as aboves, the present invention provides a process for preparing an anode material for secondary battery which can be charged/discharged in an electrolyte and has a high discharge efficiency and energy density per unit weight, by sintering a mixture of hydrogen-storage alloy systems.

What is claimed is:

1. A process for preparing an electrode for secondary battery which comprises the steps of:

(i) mixing a hydrogen-storage alloy powder free of Ni with a hydrogen-storage alloy powder containing Ni over 30 atom %;

(ii) cold-pressing the mixed powder at a pressure of 5 to 15 ton/cm$^2$;

(iii) sintering the cold-pressed mixture at 900° C. for 5 to 15 min under a vacuum condition of $10^{-2}$ to $10^{-3}$ torr; and, (iv) quenching the sintered material.

2. The process for preparing an electrode for secondary battery of claim 1, wherein the hydrogen-storage alloy powder free of Ni can store large amounts of hydrogen under a gas phase, while it can not absorb/desorb the hydrogen in electrolyte.

3. The process for preparing an electrode for secondary battery of claims 1 or 2, wherein the hydrogen-storage alloy powder free of Ni is Vi—Ti or Ti—Mn alloy system.

4. The process for preparing an electrode for secondary battery of claim 1, wherein the hydrogen-storage alloy powder containing Ni is selected from the group consisting of $LaNi_5$, Zr—Cr—Ni, Zr—Vi—Ni and Ti—Ni alloy systems.

5. The process for preparing an electrode for secondary battery of claim 1, wherein the hydrogen-storage powder containing Ni is mixed with the hydrogen-storage alloy powder containing Ni at a ratio of 25 to 100 wt %.

* * * * *